Jan. 8, 1946.   H. R. C. ANTHONY ET AL   2,392,795
DRY CELL
Filed March 11, 1940   3 Sheets-Sheet 1
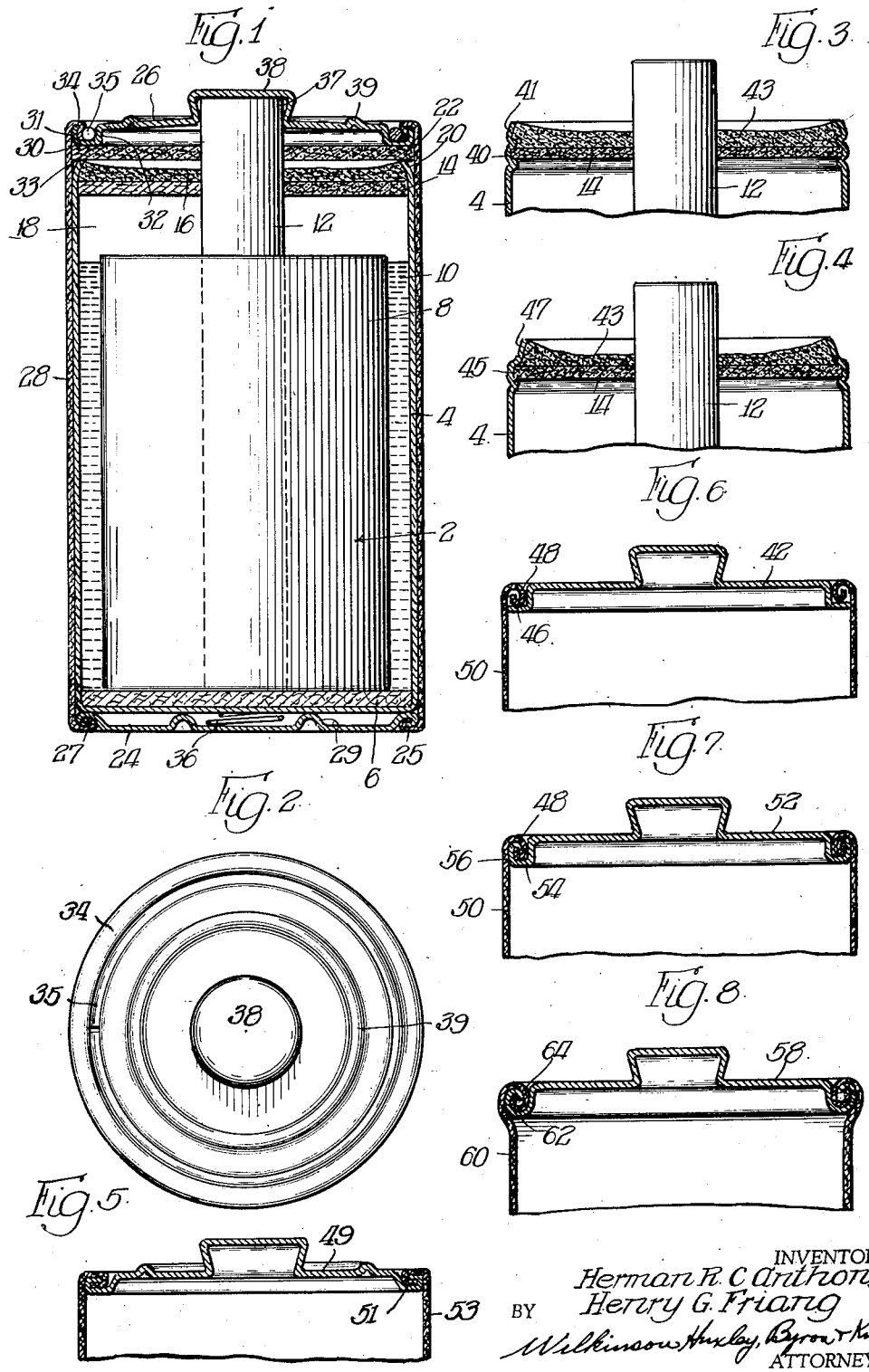

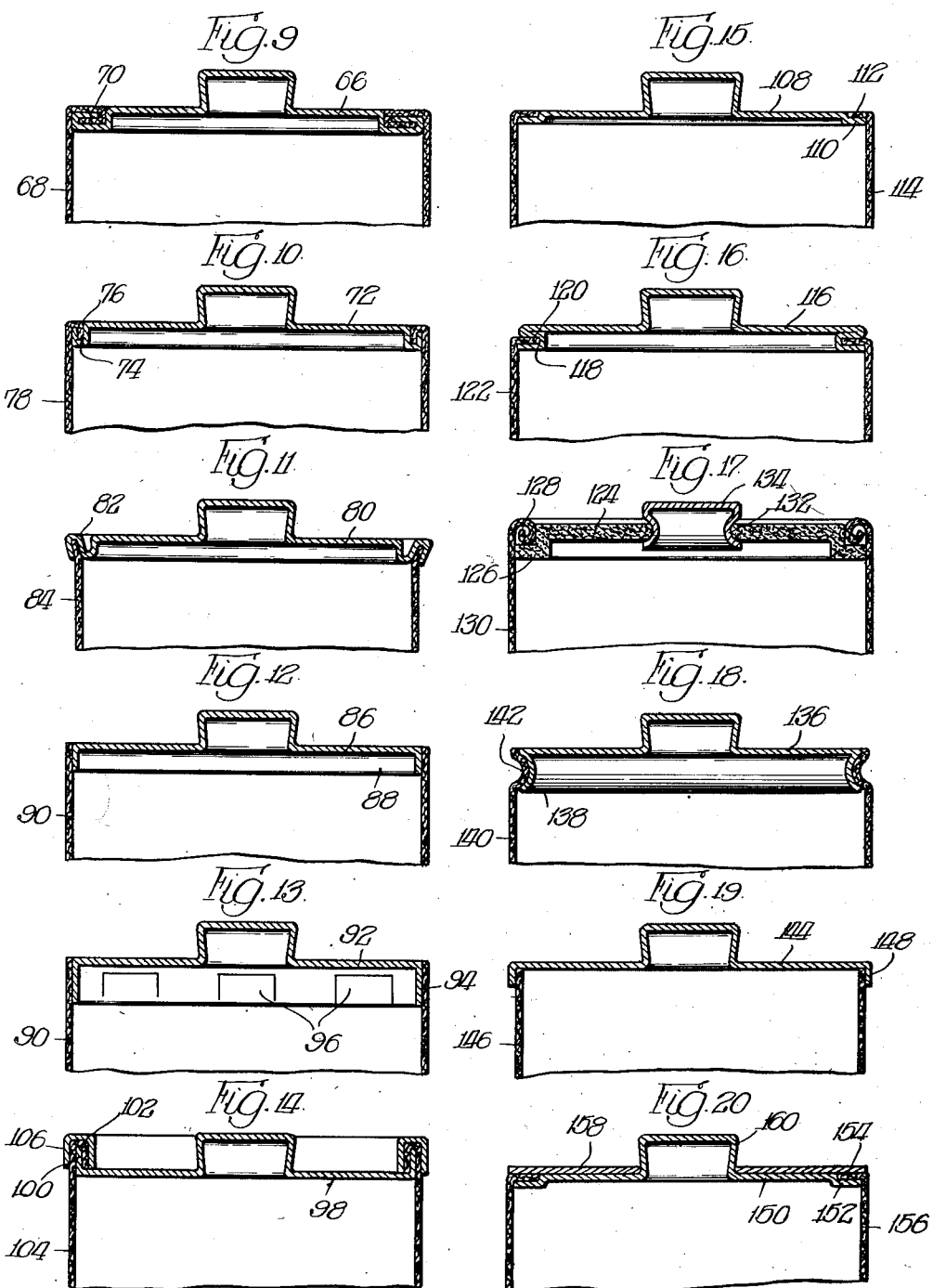

Jan. 8, 1946. H. R. C. ANTHONY ET AL 2,392,795
DRY CELL
Filed March 11, 1940 3 Sheets-Sheet 3
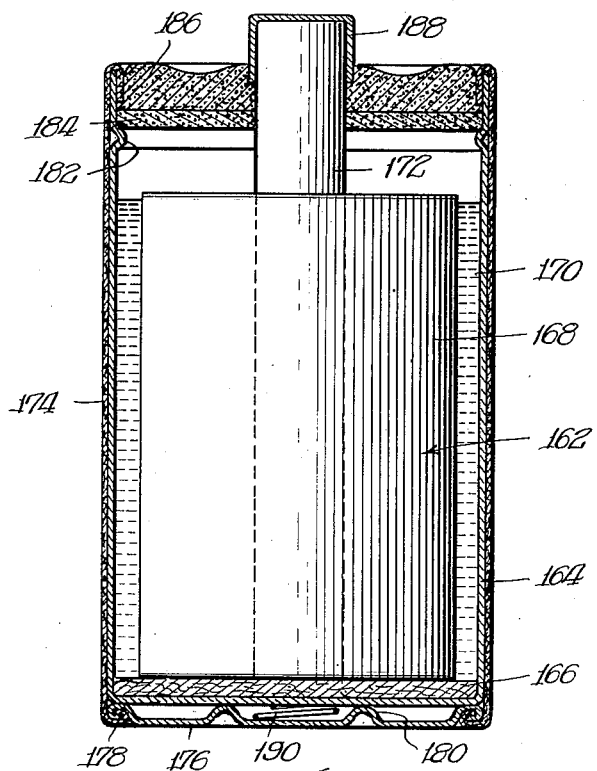
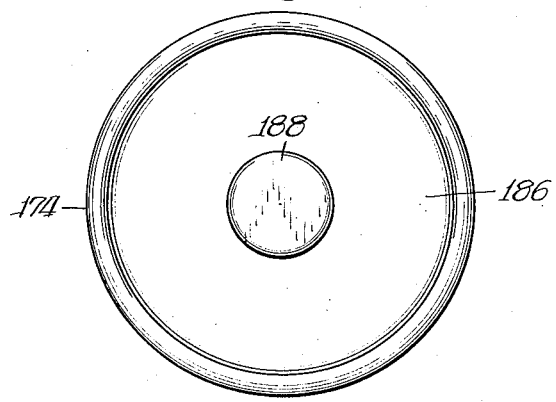
INVENTORS.
Herman R. C. Anthony,
BY Henry G. Friang,
Wilkinson, Huxley, Byron Knight
Attys.

Patented Jan. 8, 1946

2,392,795

UNITED STATES PATENT OFFICE 2,392,795

DRY CELL

Herman R. C. Anthony and Henry G. Friang, Madison, Wis., assignors to Ray-O-Vac Company, a corporation of Wisconsin Application March 11, 1940, Serial No. 323,308

5 Claims. (Cl. 136—133)

This invention relates to improvements in electrical dry cells, and more particularly to a novel construction therefor which renders the cell more durable and free from liability of leakage and resulting damage to the exterior of the cell and the surrounding parts with which the cell may be associated in use.

With dry cells of this general character it sometimes occurs that the zinc can is partially consumed and corroded during the use of the cell, whereby the walls thereof are actually eaten through so that one or more perforations are formed through which the electrolyte housed within the can is forced or otherwise leaks out the exterior thereof. Due to the generation of gases within the cell during the period of use, the interior of the cell is frequently under some slight pressure which forces the electrolyte out through the perforations so formed, with the result that the electrolyte does considerable damage to the exterior of the cell as well as to the appliance in which the cell may be used. For instance, with cells used in flashlight casings it sometimes happens that the exuding electrolyte comes in contact with the interior of the flashlight casing and does considerable damage to the casing itself and causes the cell to become stuck within the casing whereby it is difficult, if not impossible, to remove the same for replacement without doing greater damage to the casing itself.

Accordingly, it is an object of this invention to provide a practical, inexpensive and efficient cell having a protective casing which entirely eliminates the danger of leakage from the cell and the consequent elimination of the disadvantages which result from such leakage.

As another object, the present invention contemplates the idea of providing a novel battery construction incorporating a dry cell unit provided with a protective housing or casing comprising spaced metal closure members and an interconnecting closure member adapted to embrace the said dry cell unit whereby the said dry cell unit is effectively protected.

Still a further object within the scope of the present invention is to provide a novel battery including a dry cell unit and a protective housing of multi-part construction including spaced metal closure members in electrical conducting relation to the electrodes of the said dry cell unit and an interconnected impervious closure member of non-conducting material adapted to embrace the said dry cell unit and being connected to said spaced metal closure members to provide fluid-tight joints therebetween.

More particularly, the present invention includes the idea of providing in a battery construction having a dry cell unit a protective housing impervious in character to prevent leakage from the battery, and at the same time providing a structure having conducting parts in electrical conducting relation to the electrodes of the said dry cell unit whereby the said battery can be used under the same circumstances as the dry cell unit alone, yet providing a structure completely enclosing the said dry cell unit to prevent escape of deleterious fluid or the like therefrom.

Other objects, features, capabilities and advantages are comprehended by the invention, as will later appear and as are inherently possessed thereby.

Referring to the drawings:

Figure 1 is a view in cross section of a battery made in accordance with the present invention;

Figure 2 is a top plan view of the battery shown in Figure 1 of the drawings;

Figures 3 and 4 are fragmentary views in cross section disclosing alternative constructions for the dry cell unit of Figure 1 of the drawings;

Figures 5 to 20 inclusive are fragmentary views in cross section of protective housings for dry cell units showing various modifications in the construction thereof which can be used in the manufacture of a battery in accordance with the present invention;

Figure 21 is a view in cross section of a modified construction for a battery made in accordance with the present invention; and Figure 22 is a top plan view of the battery shown in Figure 21 of the drawings.

Referring now more in detail to the drawings, an embodiment selected to illustrate the present invention is shown in Figure 1 as comprising a dry cell unit 2 conforming substantially to the conventional type of construction for such a unit and including a zinc can 4 having the side wall made integral with the bottom as by way of a drawing operation. Disposed within the said zinc can 4 is an insulating disc 6 on which the core 8 is mounted in spaced relation to the said zinc can 4 to provide an annular compartment which is filled with a suitable electrolyte 10. The core 8 is of the usual type of construction, comprising a depolarizing mixture embraced by a suitable wrapping on the outside thereof and in which is centrally embedded a carbon pencil 12 which extends upwardly from the core as disclosed and provides one of the electrodes of the dry cell unit, the other of said electrodes being constituted by said zinc can or receptacle 4.

In the present embodiment the zinc can 4 extends above the core 8, and disposed in spaced relation to the said core is a washer 14 embracing the carbon pencil 12 and providing a seat for a poured seal 16 completely enclosing the dry cell unit and providing an air space 18 above the core. As disclosed in the drawings, the zinc can or receptacle 4 is spun inwardly as at 20 about the circumference thereof to provide a seat for a washer 22 of fibrous or other non-conducting material for the purpose to be hereinafter more fully disclosed.

The present invention is particularly directed to the provision of a housing for completely closing the dry cell unit, and according to the said invention such a housing takes the form of a receptacle of multi-part construction comprising spaced metal closure members 24 and 26 interconnected by a closure wall in the form of a tube 28 of non-conducting material which has a diameter conforming substantially to the outside diameter of the zinc container 4 to receive and hold the same, and which non-conducting material for said closure wall is impervious to moisture, the connection between the same and the said metal closure members 24 and 26 being such as to provide fluid-tight joints therebetween.

According to the present invention, the closure wall 28 may comprise fibrous material such as cardboard, paper or the like, which may be treated by the use of waterproofing materials to make the same impervious to moisture or fluids. As a further illustration of the construction for said closure wall, the same may consist of layers of fibrous material with the interfaces of said layers treated with asphalt or any other material which renders the same impervious. Furthermore, an impervious laminated fibrous structure may be provided by the use of Pliofilm or asphalts, as above suggested, in order to provide an impervious and substantially rigid construction.

The metal closure member 24 is interlocked about its marginal edge by way of a joint 27 to the fibrous container 28, which joint involves the interlocking of the two elements together whereby the said fibrous container has an inwardly disposed annular part 25 fully protecting the battery against short-circuiting when placed within a metal container for use. Electrical conducting relation between the dry cell unit and the said plate 24 is effected in part by the marginal edge of the closure member 24 at the joint 27 which is adapted to engage the bottom wall of the zinc container 4, and in part by an annular corrugation 29 struck inwardly from the plate into engaging relation with the bottom wall of the zinc container 4 whereby the said metal plate 24 serves in the usual capacity of a conducting element for the zinc electrode in devices where one or more of such batteries are used.

The assembly between the bottom closure member 24 and fibrous container 28 can be effected by the formation of the joint 27 by conventional means without the dry cell unit in place, after which the dry cell unit may be introduced into the open end housing and the closure member 26 connected to the fibrous container 28. A particular form of joint is contemplated in accordance with this preferred embodiment to provide an effective joint between the fibrous container 28 and the metal closure element 26 and which can be made without injury to the dry cell unit, which can be readily provided under all conditions. According to the preferred construction, the metal closure element 26 is stamped or otherwise provided with a marginal substantially U-shaped channel portion 30 having the opposed inner and outer walls 31 and 32 interconnected by way of the bottom wall 33, the said wall 31 being bent inwardly in respect of the wall 32 to provide an undercut annular shoulder adapted to receive the inturned marginal edge 34 of the fibrous container 28. This marginal edge 34 of the fibrous container may be spun inwardly into the channel 30 and pressed outwardly into interlocking relation with the undercut wall 31 by means of the split ring 35 which is forced downwardly into the channel member 30 into interlocking engagement with the inturned marginal edge 34 of the fibrous container 28 and the opposed wall 32, the diameter of the said split ring being such as to effectively press the marginal edge 34 of the fibrous container into interlocking relation with the wall 31. In order to perform this operation of spinning the marginal edge 34 inwardly and to press the said split ring 35 into the position as disclosed without injury to the underlying elements and particularly the dry cell unit, it has been found desirable to incorporate in the assembly a spiral spring 36 interposed between the closure member 24 and the bottom wall of the zinc can 4, which spiral spring tends to provide sufficient resistance to the force applied in effecting the connection between the metal closure member 26 and the fibrous container 28.

The metal closure member 26 is further provided with an offset recess 37 formed in the cap portion 38 which is adapted to receive the upper end of the carbon pencil 12 to provide an effective electrical conducting relation between said carbon pencil 12 and the said closure member 28. Further, if desired the metal closure member 26 may be provided with annular corrugations, such as 39, for reinforcing purposes.

As before mentioned, during the life of the dry cell unit gas is generated within the confines of the zinc housing 4 which is normally received within the air space 18. In order to effectively seal this gas within the dry cell unit which otherwise might displace the sealed closure formed by the poured seal 16 and the washer 14 when pressure is built up to a sufficient amount, which pressure in turn would tend to displace the closure member 26 of the protective housing, constructions for this sealed closure of the zinc can 4 may take the form as shown in either Figure 3 or 4 of the drawings. Acccording to Figure 3, the zinc can 4 is formed adjacent its upper end to provide an inwardly disposed circumferential channel 40 adapted to receive the insulating washer 14 and to lock the same in place, the marginal edge of the said zinc can being spun inwardly as at 41 to provide an inwardly disposed wall portion adapted to receive and interlock with the poured seal 43.

If desired, the interlocking relation between the insulating washer 14 and the zinc can 4 adjacent its upper marginal edge may be effected in accordance with Figure 4 of the drawings wherein the said can adjacent its upper marginal edge is formed with an inwardly disposed circumferentially extending channel 45 adapted to interlock with the said insulating washer 14, the said upper marginal edge 47 of the can being inwardly disposed as disclosed to provide an interlocking wall for the poured seal 43.

From the above description it will be quite apparent that an effective protective housing has been formed to completely enclose the dry cell unit to retain any fluids which may leak from the dry cell unit. The protective housing is of such a construction as to provide a side wall or closure element which is of non-conducting material, yet impervious, and at the same time providing the end closure members of conducting material in active conducting relation to the electrodes of the dry cell unit whereby the completed assembly may be used in exactly the same way in various apparatuses and devices as would the dry cell unit be used alone. It is of course understood that closure members 24 and 26 may be formed of any desirable metal, and may be constructed as by way of stamping or the like from terneplate, iron or steel which may be plain or lithographed, as desired.

Although the hereinabove described embodiment discloses a type of construction incorporating a preferred form of connection between the spaced metal closure members and the insulating impervious container or closure member extending therebetween, nevertheless various other forms of joints may be provided to connect the said elements of the protective housing or casing as illustrated in Figures 5 to 20 inclusive. Although the modified forms of joints according to Figures 5 to 20 inclusive disclose the connection between the top metal closure member and said impervious fibrous container or closure member, nevertheless it is to be understood that such joints may be used to connect the bottom metal closure member to the said impervious fibrous receptacle or closure member.

Figure 5 of the drawings discloses the metal closure member 49 with its marginal edge connected to the marginal edge of the fibrous container 53 by the locked seam joint 51 which provides a fluid-tight and effective connection therebetween.

The embodiment of Figure 6 discloses the metal closure member 42 provided with an annular marginal abutting flange 46 adapted to receive the upper curled marginal edge 48 of the fibrous container 50.

In Figure 7 of the drawings the upper closure member 52 conforms substantially to that shown in Figure 6 of the drawings except that the marginal flange 54 thereof is turned upwardly as at 56 to provide an annular channel adapted to receive the curled marginal edge 48 of the container member 50.

According to Figure 8 of the drawings, the closure member 58 is locked with the container member 60 by the rolled marginal channel-shaped flange 62 curled about the inwardly curled marginal edge 64 of the container member 60 and which is embraced by said curled marginal flange 62.

Figure 9 discloses an arrangement wherein the metal closure member 66 is interlocked with the impervious fibrous container 68 at its marginal edge by the locked joint 70, all in accordance with the disclosure of the drawings.

Figure 10 discloses still another form of construction wherein the metal closure member 72 is provided with an annular channel 74 adapted to receive and lock in place the marginal inturned edge 76 of the fibrous container member 78.

In accordance with the disclosure of Figure 11 of the drawings, the metal closure member 80 is provided with the downwardly open annular channel 82 whereby the metal is spun onto the upper marginal edge of the fibrous container member 84.

In Figure 12 of the drawings, the metal closure member 86 is shown as being formed with a depending annular flange 88 adapted to frictionally fit within the open end of the fibrous container member 90 or, if desired, the metal closure member may be firmly and positively connected to the said container member by the use of some suitable material adapted to interlock the two surfaces of the container and closure members together, such, for example, as glue or the like.

Figure 13 discloses the metal closure member 92 of a construction similar to that shown in Figure 12 except that the marginal flange 94 is of somewhat greater depth and is provided with a plurality of struck-out tabs 96 adapted to become embedded in the fibrous container member 90, it being understood that in accordance with this disclosure material may be used to provide an absolutely tight joint between the two members according to the above description relating to Figure 12.

Where desired, the modification of Figure 14 may be followed wherein the closure member 98 is disclosed as being formed with a marginal upstanding flange 100 adapted to be received within the channel of the inwardly and downwardly disposed marginal edge 102 of the fibrous container member 104, the members being secured by a second metal piece in the form of an annular channel member 106 adapted to embrace the fibrous container member at the joint for holding the same, together with the closure member 98 in place, and to provide a fluid-tight joint.

According to Figure 15 of the drawings, the closure member 108 is provided with a marginal depressed portion 110 providing a flange over which the marginal edge 112 of the fibrous container member 114 may be bent to provide a joint between the elements of the protective housing.

If desired, the connection between the parts of the protective housing may be formed as disclosed in Figure 16, wherein the closure member 116 has its marginal edge bent as disclosed to provide the circumferentially disposed open channel portion 118 which is adapted to receive the inwardly projecting marginal edge 120 of the fibrous container member 122 whereby the metal plate is locked with the said fibrous container member.

Figure 17 discloses a somewhat different construction than those hereinbefore described in that the closure member 124 is of insulating material provided with the depressed marginal flange 126 adapted to receive the marginal and inwardly rolled edge 128 of the fibrous container member 130, the said insulating closure member 124 being formed with a substantially centrally disposed opening 132 adapted to receive and hold a metal cap 134 in position which is adapted to engage with and embrace the carbon pencil of the dry cell unit whereby said cap 134 serves as one of the electrodes for the completely protected cell unit.

In the embodiment disclosed in Figure 18, the metal closure member 136 is formed with depending curved channeled flange 138 adapted to be received within the fibrous container member 140 and being connected thereto by way of the inwardly extending rolled part 142 of the said container member.

According to Figure 19 of the drawings, the connection between the metal closure member 144 and the fibrous container member 146 may be effected by providing the said metal closure member 144 with a marginal depending flange 148 adapted to receive the upper marginal edge of the fibrous container member whereby the same are frictionally secured together, it being understood, of course, that if other sealing means is desired as described in connection with Figures 12 and 13, such may be used in the said embodiment.

Figure 20 discloses still a further embodiment of the invention wherein the closure member 150 is provided with a marginal offset flange 152 similar to the construction shown in Figure 15 of the drawings, which is adapted to receive the inturned end 154 of the fibrous container member 156, the said connection being further perfected by way of a second metal sheet 158 embracing the substantially centrally disposed cap portion 160 and having its margins in overlapping relation to the inturned marginal edge 154 of the fibrous container member.

As a further illustration of an embodiment of the present invention, reference is made to Figures 21 and 22 wherein the battery comprises a dry cell unit 162 including a zinc can 164 having the side wall made integral with the bottom as by way of a drawing operation. Disposed within the zinc can 164 is an insulating disc 166 upon which the core 168 is mounted in spaced relation to the zinc can 164 to provide an annular compartment which is filled with a suitable electrolyte 170. The core 168 comprises a depolarizing mixture embraced by a suitable wrapping on the outside thereof and in which is centrally embedded a carbon pencil 172 which extends upwardly from the core as disclosed and provides one of the electrodes of the dry cell unit, the other of the electrodes for said unit being constituted by said zinc can or receptacle 164.

As in the embodiment disclosed in Figure 1, the present invention is more particularly directed to a protective housing for completely enclosing the said dry cell unit to prevent leakage of fluids and the like therefrom while in use. According to this modified construction for a battery, the said protective housing is constituted by an open end container 174 of non-conducting material, such as fibrous material, which may be treated in accordance with the hereinabove disclosure relating to the embodiment of Figure 1, and which open end container is closed by a metal closure disc 176 having its marginal edges interlocked with the said container 174 as at 178 and being provided with an inwardly disposed annular offset 180 which has electrical contacting relation with the bottom of the zinc can 164. As in the previous illustration, the seam or joint provided between the metal plate 176 and the end of the container 174 is so formed that the marginal edge of container 174 overlaps the closure member 176 and is interlocked therewith to form said joint. Thus the exposed surface of the metal plate 176 has a diameter less than the outside diameter of the container 174 and the marginal edge thereof is spaced from the marginal surface of said container. Therefore, according to this form of construction, short circuiting of the battery under normal conditions of use is impossible.

In the modified construction according to Figure 21, the zinc can 164 extends upwardly beyond the top of the core 168 and is provided with an inwardly extending circumferentially disposed bead 182 providing a support for an insulating washer 184, which in part provides for a seal at the upper end of the battery construction. As illustrated, the upper end of the container 174 has its marginal edge rolled inwardly over the marginal edge of the zinc can 164 to interlock therewith and to position said protective housing in respect of the said zinc can, the closure means for the upper end of the battery being constituted in part by sealing material 186 in the form of a wax which can be poured into position upon the sealing washer 184 to interlock the inturned marginal edge of the container 174 and to provide a hermetic seal for the battery at that point in the construction. The sealing means is further perfected by way of a metal cap 188 which embraces the end of the carbon pencil 172 and is overlapped by the sealing material 186 which, when the same sets, provides a permanent and effective sealing means for the dry cell unit. In order to resist downward pressure upon the dry cell unit 162 and associated parts during the formation of the sealing means at the top of the battery, a spiral spring 190 may be interposed between the closure member 176 and the bottom of the zinc can 164, all in accordance with the embodiment shown in Figure 1 and hereinbefore described.

According to the arrangement for the battery construction as shown in Figures 21 and 22, the dry cell unit 162 may be constructed as has been practiced in the art. Furthermore, the protective housing may be readily formed in part to include the closure member 176, after which the same may be placed over the dry cell unit and the sealing means effected at the top to provide a fluid-tight protective housing for the battery construction. It will be clearly appreciated that in accordance with this modified construction for the battery the final step in the construction of the completed device can be readily effected by spinning or otherwise moving the marginal end of the container 174 into embracing relation with the upper end of the zinc can 164 to make ready the device for receiving the sealing material 186. This pouring operation is readily effected, after which the battery is completed to fully protect the dry cell unit and to prevent the loss by leakage of fluids from the assembly which have deleterious effects upon the various devices with which the same may be used.

In accordance with the present invention, although the protective housing or casing has been disclosed and described in its operative association with a single dry cell, nevertheless the said invention embraces within its scope various other assemblies incorporating a plurality of such dry cells therein, and accordingly, in the specification and claims where the term "dry cell unit" has been used to describe the invention, it is to be understood that such language comprehends one or more of such dry cells in the combination.

While we have herein described and upon the drawings shown illustrative embodiments of the invention, it is to be understood that the invention is not limited thereto but may comprehend other constructions, arrangements of parts, details and features without departing from the spirit of the invention:

We claim:

1. In a battery, the combination of a dry cell unit, a housing therefor, said housing including a container of fibrous material and a metal closure element therefor, said closure element having a marginal channel portion, said container of fibrous material having its marginal edge overlapping one of the walls of said channel portion and extending into the recess of said channel portion, and a metal ring member disposed in said recess and in wedging engagement with the said marginal edge of said fibrous container and the opposed wall of said channel portion.

2. In a battery, the combination of a dry cell unit, a housing therefor, said housing including a container of fibrous material and a metal closure element therefor, said closure element having a marginal channel portion formed with an outer circumferential inwardly extending wall providing a locking shoulder, said container of fibrous material having its marginal edge overlapping said wall and extending into the recess of said channel portion, and a metal ring member disposed in said recess and in wedging engagement with the said marginal edge of said fibrous container and the opposed wall of said channel portion for wedging said marginal edge into interlocking relation with said locking shoulder.

3. In a battery, the combination of a dry cell unit having an electrode constituted by a metal container and another electrode disposed within said container and extending beyond the same, said metal container having an inturned open end provided with a seal, a protective casing for said unit comprising a cylindrical closure wall of non-conducting material embracing said container, opposed top and bottom metal closure members connected to said cylindrical closure wall, said bottom closure member having electrical conducting relation with said metal container and being connected to said cylindrical closure wall by an interlocking overlapping joint providing a seat for said metal container on the interior thereof and being defined exteriorly by an inturned annular marginal insulating strip formed by said closure wall, said top closure member having an offset recess embracing said second-named electrode and a marginal recess to receive said closure wall in overlapping relation, a metal ring member disposed in said recess in wedging relation to said closure member and closure wall, and a positioning member between said inturned open end and the joint formed between said top closure member and said closure wall.

4. A dry-cell comprising: an electrically non-conductive cylindrical shell having its marginal end portions turned inwardly; a metal bottom closure of less diameter than the exterior of said shell and having its marginal portions bent to engage opposite faces and grip firmly the lower marginal end portions of the shell to form a liquid-tight joint therewith; a zinc electrode in said shell making electrical contact with said bottom closure; a centrally disposed carbon electrode with depolarizing mix resting in electrolyte in the shell; and a top closure of less diameter than the exterior of said shell having an exposed metal top in contact with the carbon electrode and making a liquid-tight joint with the cylindrical shell.

5. A dry-cell as specified in claim 4, in which the cylindrical shell is made of fibrous material impregnated with asphalt and the lower end portions of said shell are also turned upwardly and outwardly within the diameter of the shell and the marginal edge portions of the metal closure are turned downwardly and inwardly to form an interlocking overlapping joint therewith.

HERMAN R. C. ANTHONY.
HENRY G. FRIANG.